US012151487B2

(12) United States Patent
Nihashi

(10) Patent No.: US 12,151,487 B2
(45) Date of Patent: Nov. 26, 2024

(54) PRINTER

(71) Applicant: TOSHIBA TEC KABUSHIKI KAISHA, Tokyo (JP)

(72) Inventor: Kiyotaka Nihashi, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 77 days.

(21) Appl. No.: 18/087,780

(22) Filed: Dec. 22, 2022

(65) Prior Publication Data

US 2023/0373233 A1 Nov. 23, 2023

(30) Foreign Application Priority Data

May 23, 2022 (JP) ................................ 2022-083789

(51) Int. Cl.

| | |
|---|---|
| ***B41J 29/13*** | (2006.01) |
| ***B41J 11/00*** | (2006.01) |
| ***B41J 15/04*** | (2006.01) |
| *B65H 26/08* | (2006.01) |

(52) U.S. Cl.
CPC .......... *B41J 29/13* (2013.01); *B41J 11/0075* (2013.01); *B41J 15/04* (2013.01); *B65H 26/08* (2013.01)

(58) Field of Classification Search
CPC ........ B41J 29/13; B41J 11/0075; B41J 15/04; B65H 26/08
See application file for complete search history.

(56) References Cited

U.S. PATENT DOCUMENTS

| | | | |
|---|---|---|---|
| 2008/0095564 A1* | 4/2008 | Yada | B41J 15/042 400/613 |
| 2019/0291481 A1* | 9/2019 | Yazawa | B65H 23/085 |

FOREIGN PATENT DOCUMENTS

| | | | |
|---|---|---|---|
| JP | 2009096595 A * | 5/2009 | B65H 16/08 |
| JP | 2018-008823 A | 1/2018 | |
| WO | WO-2016013576 A1 * | 1/2016 | B41J 15/04 |

* cited by examiner

*Primary Examiner* — Yaovi M Ameh
(74) *Attorney, Agent, or Firm* — Kim & Stewart LLP

(57) ABSTRACT

A printer includes a housing storing a rolled sheet and having an opening, a head, a cover covering the opening, a first flapper attached to the cover via a first shaft at a first end of the flapper, pivoting around the shaft, and biased to press the sheet with a second end thereof, the first end being closer to a front side of the cover than the second end, a second flapper attached to the cover via a second shaft at a first end of the second flapper and pivoting around the second shaft, a second end of the second flapper being closer to the front side than the first end and slidably connected to a center portion of the first flapper, and a sensor detecting that a remaining amount of the sheet has decreased to a predetermined amount, based on an angle by which the second flapper has pivoted.

20 Claims, 14 Drawing Sheets

G-G

PRINTER

CROSS-REFERENCE TO RELATED APPLICATION(S)

This application is based upon and claims the benefit of priority from Japanese Patent Application No. 2022-083789, filed May 23, 2022, the entire contents of which are incorporated herein by reference.

FIELD

Embodiments described herein relate generally to a printer.

BACKGROUND

A thermal printer is widely used in a store to print information on a sheet, which is stored in a rolled shape and pulled out when an image is printed on the sheet. One example of such a sheet is a label sheet including a plurality of labels without a base sheet or liner. Further, in order to reduce the time and effort for replacing the sheet, a drop-in method has been proposed in which the rolled sheet can be set by simply inserting the rolled sheet into a storage portion of the printer.

In such a drop-in printer, since the core of the rolled sheet is not fixed to the storage portion, when the sheet is pulled in the sheet discharge direction, the rolled sheet is irregularly moved inside the printer. Therefore, it is difficult to accurately measure the remaining amount of the rolled sheet.

For this reason, a conventional drop-in printer has a pressing roller by which the rolled sheet is pressed from the downstream side (i.e., sheet discharge side) toward the upstream side (i.e., rolled sheet side) to suppress the movement of the rolled sheet.

In such a conventional drop-in printer, a sensor is installed in the storage portion to detect the remaining amount of the rolled sheet. However, the sensor usually detects the remaining amount when the rolled sheet having the same width continues to be used. Thus, there is a need for a printer capable of accurately detecting the remaining amount of another rolled sheet having a width different from the previously used rolled sheet.

SUMMARY OF THE INVENTION

Embodiments of the present invention provide a printer capable of accurately detecting a remaining amount of a rolled sheet regardless of the width thereof.

A printer according to an embodiment includes a housing in which a rolled sheet is stored and having an opening through which the rolled sheet can be replaced, a head in the housing and configured to print on the rolled sheet, a cover by which the opening can be covered, a first flapper attached to the cover via a first shaft at a first end of the first flapper, configured to pivot around the first shaft, and biased to press the rolled sheet with a second end of the first flapper, the first end of the first flapper being closer to a front side of the cover than the second end of the first flapper, a second flapper attached to the housing via a second shaft at a first end of the second flapper and configured to pivot around the second shaft, a second end of the second flapper being closer to the front side of the cover than the first end of the second flapper and slidably connected to a center portion of the first flapper, and a sensor configured to detect that a remaining amount of the rolled sheet has decreased to a predetermined amount, based on an angle by which the second flapper has pivoted.

DETAILED DESCRIPTION

Hereinafter, embodiments of the present invention will be described in detail with reference to the accompanying drawings.

(Overall Configuration of Thermal Printer 10)

Figure 1:
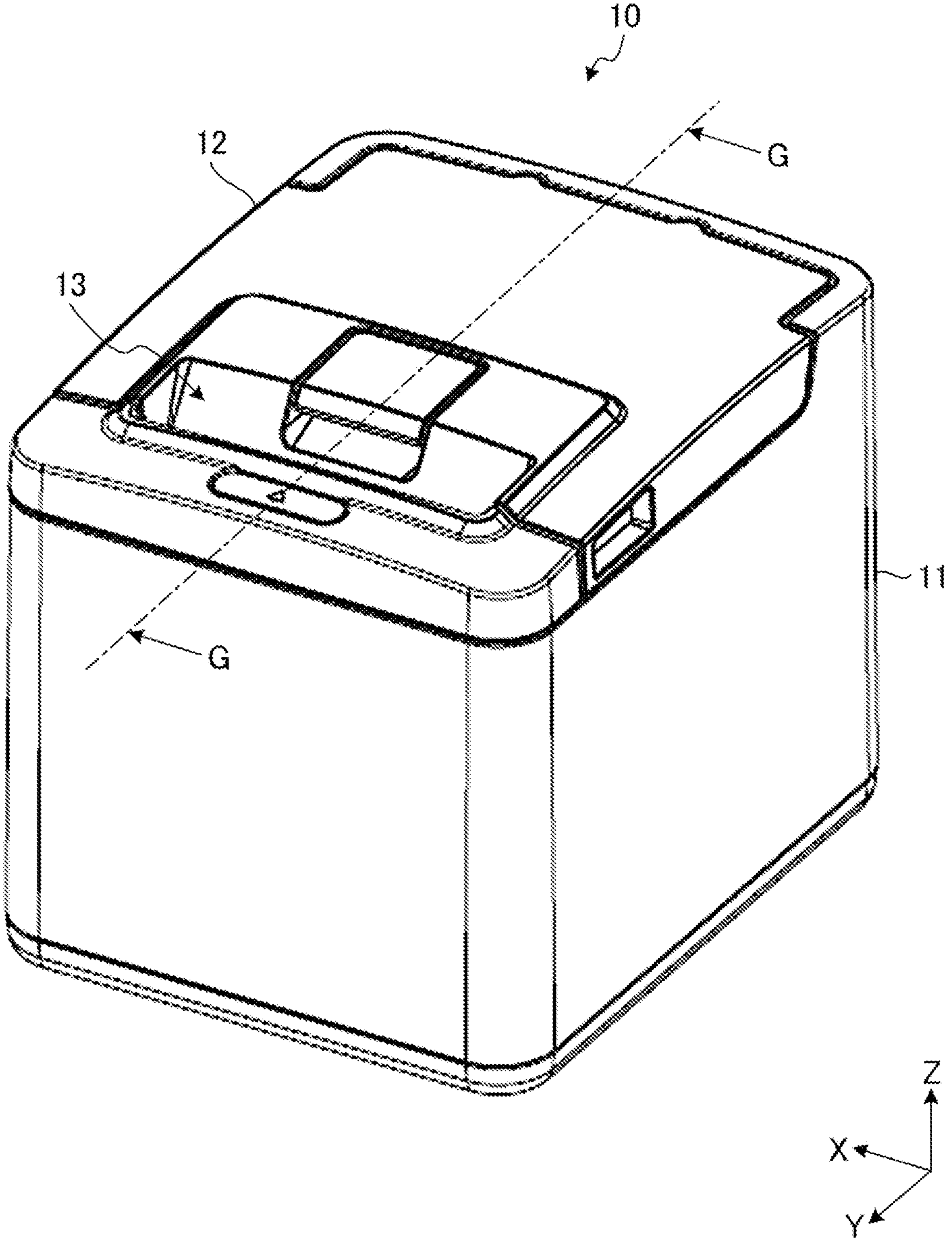
FIG. 1 is a perspective view of an external appearance of a thermal printer according to an embodiment.
Figure 2:
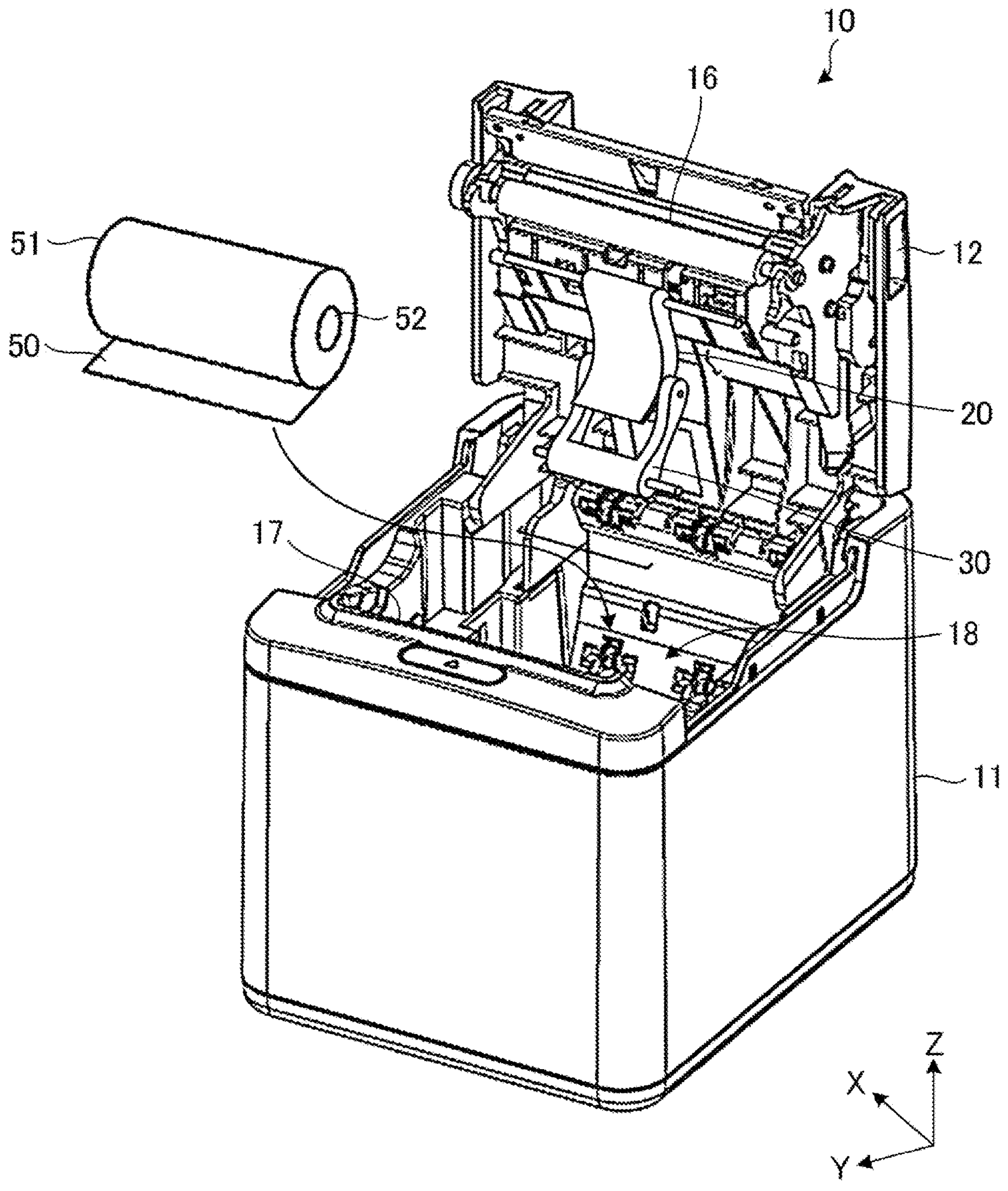
FIG. 2 is a perspective view of the thermal printer in a state in which an upper cover thereof is opened.

A schematic configuration of a thermal printer 10 according to a first embodiment will be described with reference to FIGS. 1 and 2. FIG. 1 is a perspective view illustrating an example of an external appearance of the thermal printer 10. FIG. 2 is a perspective view illustrating the thermal printer 10 in a state in which an upper cover 12 thereof is opened.

As illustrated in FIG. 1, the thermal printer 10 includes a lower housing 11, the upper cover 12, and a sheet discharge port 13. The lower housing 11 is a box-shaped container in which an opening is provided along one surface. The lower housing 11 is provided with a connection terminal (not shown) used for connection with an external device such as a host computer for managing the thermal printer 10, a power supply terminal (not shown) for supplying power to the thermal printer 10, and the like. As shown in FIG. 2, the upper cover 12 opens and closes a storage unit 18. The upper cover 12 has an end portion in the negative Y-axis direction of the lower housing 11 rotatably supported around a rotation axis along the X-axis, and opens and closes the storage unit 18 of the lower housing 11 in accordance with the rotation. Note that the upper cover 12 is also referred to as the main body cover in the present disclosure.

As illustrated in FIG. 2, in the thermal printer 10, a rolled sheet 51 formed by winding a thermal sheet 50, which is an example of a print sheet, around a roll core 52 in a roll shape is stored in the storage unit 18 inside the lower housing 11. Printing is performed while the thermal sheet 50 is pulled out from the rolled sheet 51.

The thermal printer 10 includes a first flapper 20, a second flapper 30, a platen roller 16, a thermal head 17, and the storage unit 18 inside the lower housing 11.

The thermal printer 10 pulls out the thermal sheet 50 from the rolled sheet 51 by the rotation of the platen roller 16. Then, the thermal printer 10 performs printing by bringing the thermal head 17 into contact with the drawn thermal sheet 50.

The first flapper 20 and the second flapper 30 are rotatable members rotatably installed on the rear side of the upper cover 12. The first flapper 20 abuts against the outer peripheral surface of the rolled sheet 51 and presses the rolled sheet 51 against the inner wall of the storage unit 18. As a result, movement of the rolled sheet 51 inside the storage unit 18 is prevented. The second flapper rotates along with the first flapper 20 towards the rolled sheet 51. The structures and functions of the first flapper 20 and the second flapper 30 will be described in detail later.

Figure 3:
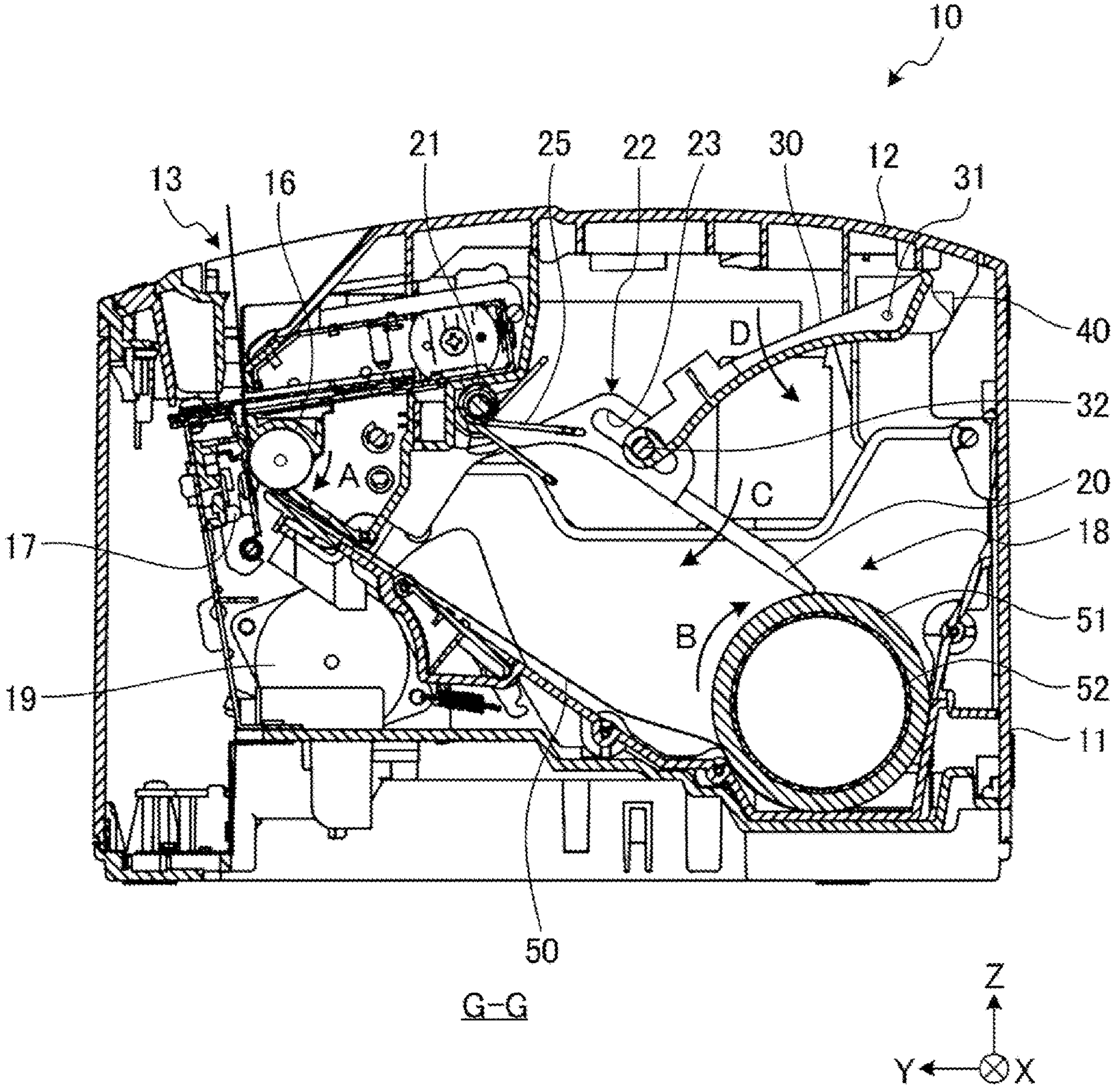
FIG. 3 is a YZ cross-sectional view of the thermal printer taken along a cutting line G-G shown in FIG. 1.

The platen roller 16 is installed along the X-axis on the rear surface side of the upper cover 12, and is rotationally driven by a stepping motor 19 (see FIG. 3). The platen roller 16 is rotationally driven to convey the thermal sheet 50 drawn out from one end of the rolled sheet 51 from the storage unit 18 on the upstream side toward the thermal head 17 on the downstream side.

The thermal head 17 is a printing unit installed on the inner surface of the lower housing 11. The thermal head 17 is in close contact with the platen roller 16 in a state where the upper cover 12 is closed. The thermal sheet 50 is conveyed toward the sheet discharge port 13 in a state of being sandwiched between the thermal head 17 and the platen roller 16. The thermal head 17 has a structure in which a plurality of heating elements are aligned, and performs printing on the thermal sheet 50 sandwiched between the thermal head 17 and the platen roller 16 by causing the heating elements corresponding to a printing pattern to generate heat.

The storage unit 18 stores the rolled sheet 51 wound in a roll shape.

(Internal Structure of Thermal Printer 10)

The internal structure of the thermal printer 10 will be described with reference to FIG. 3. FIG. 3 is a YZ cross-sectional view of the thermal printer 10 taken along a cutting line G-G shown in FIG. 1.

The platen roller 16 is installed along the X-axis on the rear surface side of the upper cover 12, and is rotationally driven in the direction of the arrow A by the stepping motor 19. The platen roller 16 is rotationally driven in the direction of the arrow A to convey the thermal sheet 50 drawn out from one end of the rolled sheet 51 from the storage unit 18 on the upstream side toward the thermal head 17 on the downstream side.

One end side (i.e., Y-axis positive side) of the first flapper 20 is disposed inside the upper cover 12 so as to be rotatable about a first rotation shaft 21 along the X-axis. The first flapper 20 is biased in a direction away from the upper cover 12, that is, in a direction indicated by an arrow C illustrated in FIG. 3, by a torsion spring 25 installed on the first rotation shaft 21. The other end side (i.e., Y-axis negative side) of the first flapper 20 abuts against the outer peripheral surface of the rolled sheet 51.

The second flapper 30 is installed such that one end side (i.e., Y-axis negative side) thereof is rotatable about a second rotation shaft 31 along the X-axis, which is installed in the lower housing 11. That is, the first rotation shaft 21 and the second rotation shaft 31 are installed in parallel. The other end side (i.e., Y-axis positive side) of the second flapper 30 is connected to a connecting portion 22 formed in the central portion of the first flapper 20 to be slidable in accordance with the angle of the first flapper 20. More specifically, the other end side of the second flapper 30 is slidable along an elongated hole-shaped connecting hole 23 formed inside the connecting portion 22 and connected thereto by an axial connecting member 32.

A photosensor 40 (for example, see FIGS. 5A and 5B) for detecting that the remaining amount of the rolled sheet 51 has decreased is installed inside the lower housing 11. The photosensor 40 is constituted by, for example, a photo interrupter including a light transmitting unit and a light receiving unit, and detects the posture of the second flapper 30 that changes in accordance with the remaining amount of the rolled sheet 51. More specifically, the photosensor 40 is installed inside the lower housing 11 toward the vicinity of the end of the second flapper 30 on the side of the second rotation shaft 31 and detects an angle of the second flapper 30 that rotates around the second rotation shaft 31.

(Configuration of Flappers 20 and 30)

Figure 4A:
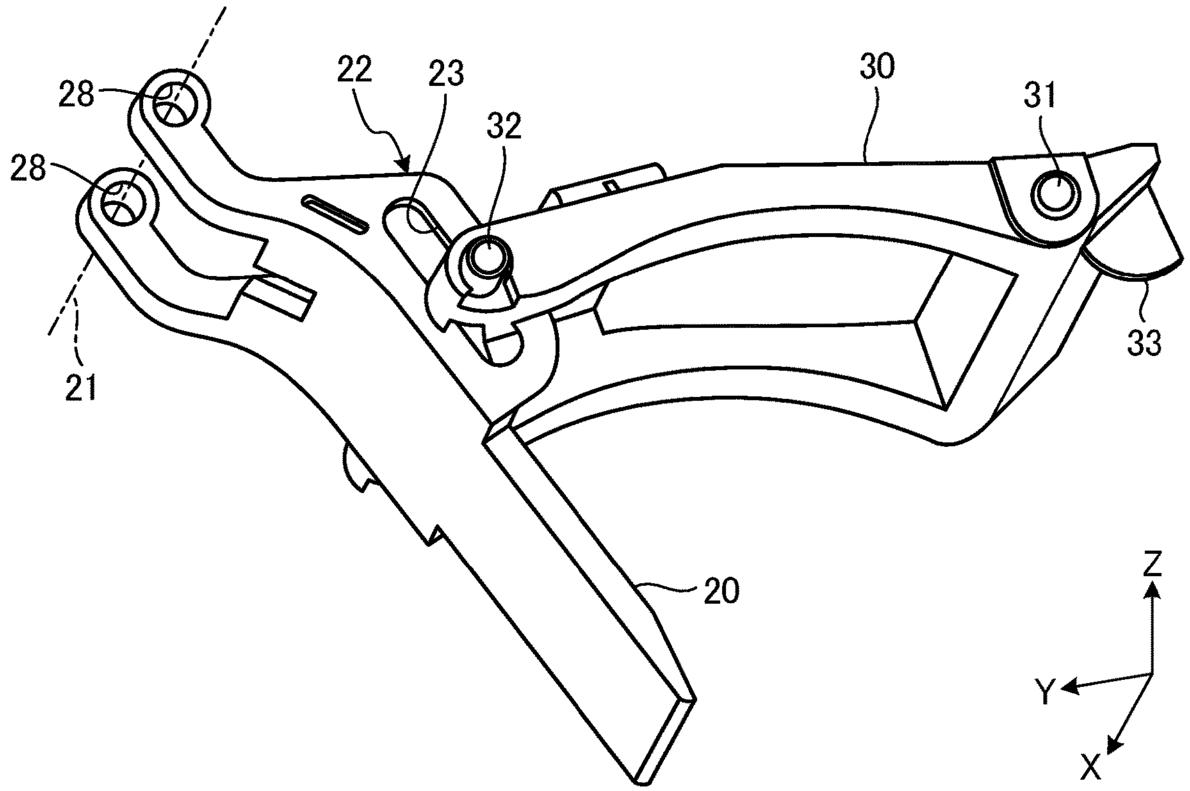
FIG. 4A is a first perspective view showing an external view of a first flapper and a second flapper provided in the thermal printer.
Figure 4B:
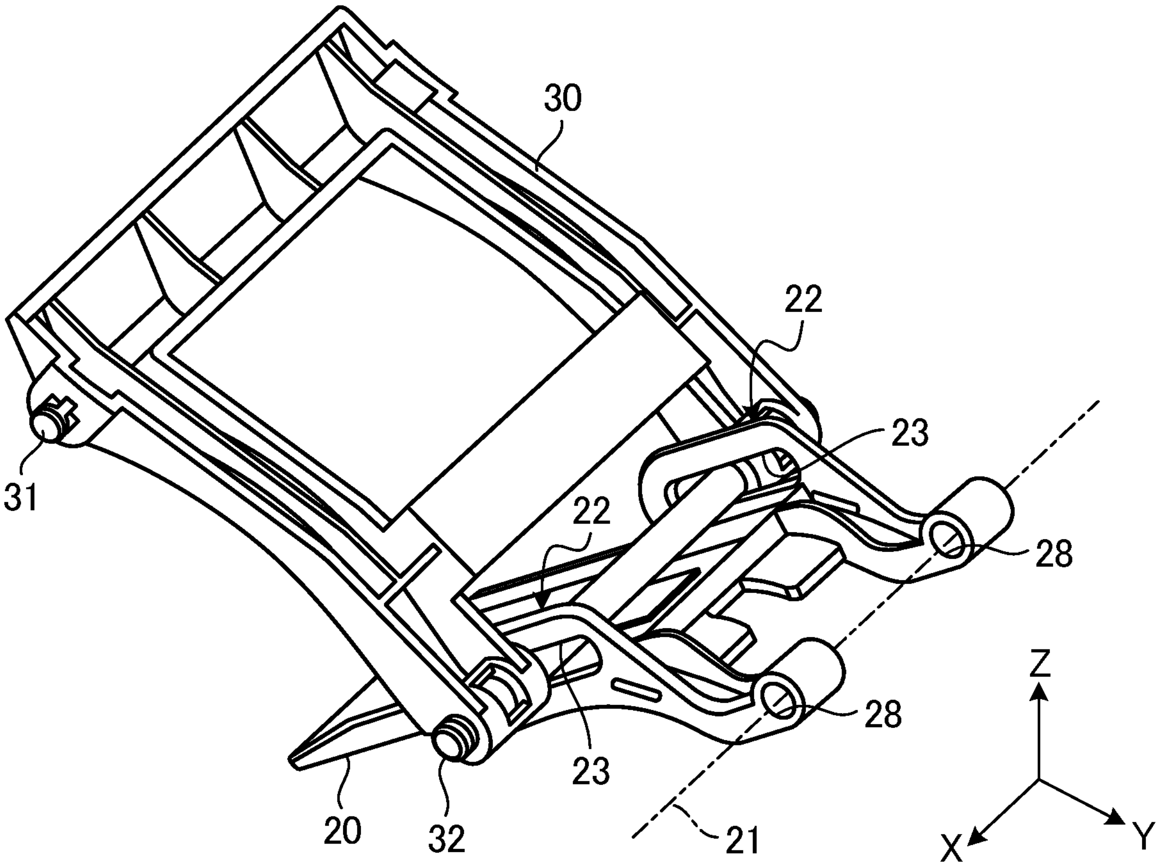
FIG. 4B is a second perspective view showing an external view of the first flapper and the second flapper of the thermal printer.

The configuration of the first flapper 20 and the second flapper 30 will be described with reference to the FIGS. 4A and 4B. FIG. 4A is a first perspective view showing an external view of the first flapper 20 and the second flapper 30 provided in the thermal printer 10. FIG. 4B is a second perspective view showing an external view of the first flapper 20 and the second flapper 30 provided in the thermal printer 10.

As shown in FIGS. 4A and 4B, the first flapper 20 includes a bearing 28 into which the first rotation shaft 21 is inserted. A torsion spring 25 (see FIG. 8A) is installed around the first rotation shaft 21. The torsion spring 25 biases the first flapper 20 in the Z-axis negative direction (i.e., the downward direction in FIG. 3), that is, in a direction towards the rolled sheet 51.

Further, as shown in FIGS. 4A and 4B, the second flapper 30 includes a parallel-forked support member extending along the Y-axis direction from the vicinity of both ends of the second rotation shaft 31. The axial connecting member 32 is installed at the distal end of the support member along the X-axis. The connecting member 32 is inserted into two connecting portions 22 formed in the first flapper 20, and slides along the connecting holes 23 formed inside the connecting members 32. When the first flapper 20 is rotated about the first rotation shaft 21, the connecting member 32 slides along the connecting holes 23, and thus the second flapper 30 is rotated about the second rotation shaft 31. Accordingly, the second flapper moves to a position corresponding to the rotation position of the first flapper 20.

That is, the second flapper 30 has a posture corresponding to the position of the outer peripheral surface of the rolled sheet 51 on which the leading end of the first flapper 20 abuts, that is, the remaining amount of the rolled sheet 51. A protrusion 33 is disposed at the end of the second flapper 30 on the side of the second rotation shaft 31 and moves to a position corresponding to the posture of the second flapper 30. The photosensor 40 described below detects that the second flapper 30 is in a predetermined posture by outputting a signal corresponding to the position of the protrusion 33. The thermal printer thereby detects that the remaining amount of the rolled sheet 51 has decreased.

(Remaining Amount Detection)

Figure 5A:
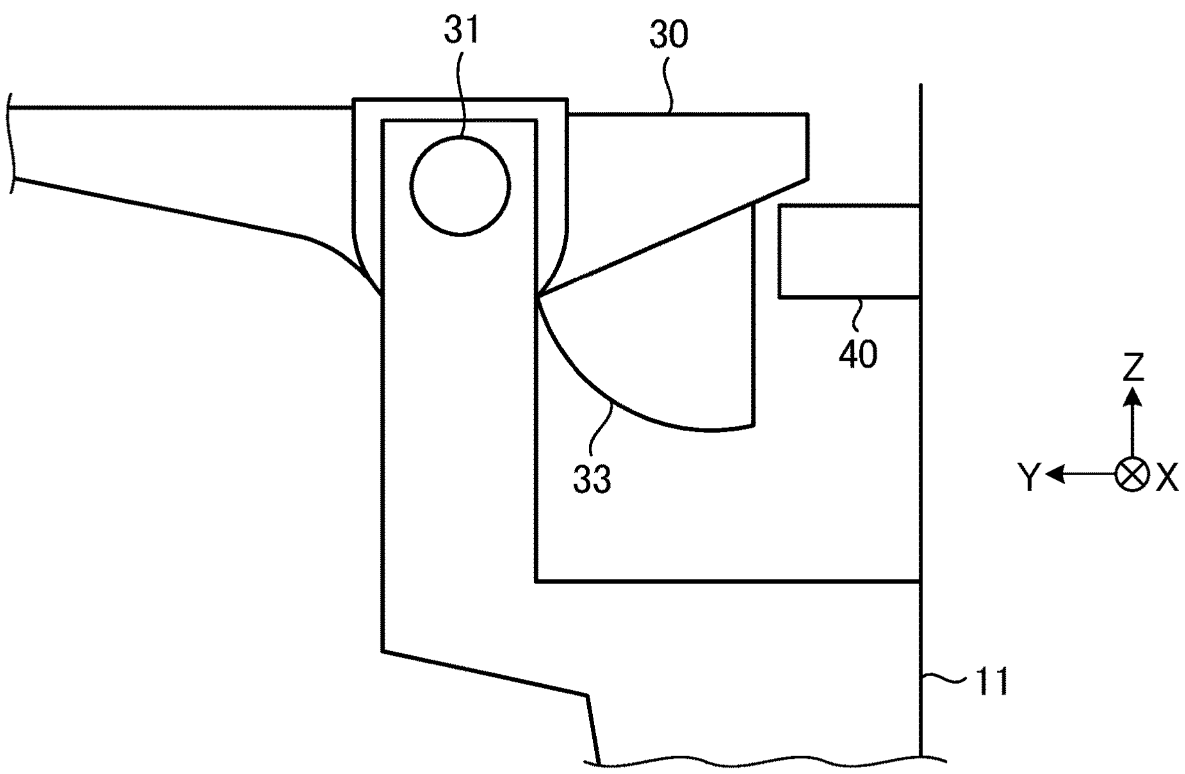
FIG. 5A depicts a positional relation between the second flapper and a photosensor when the remaining amount of a rolled sheet is sufficiently large in the thermal printer.
Figure 5B:
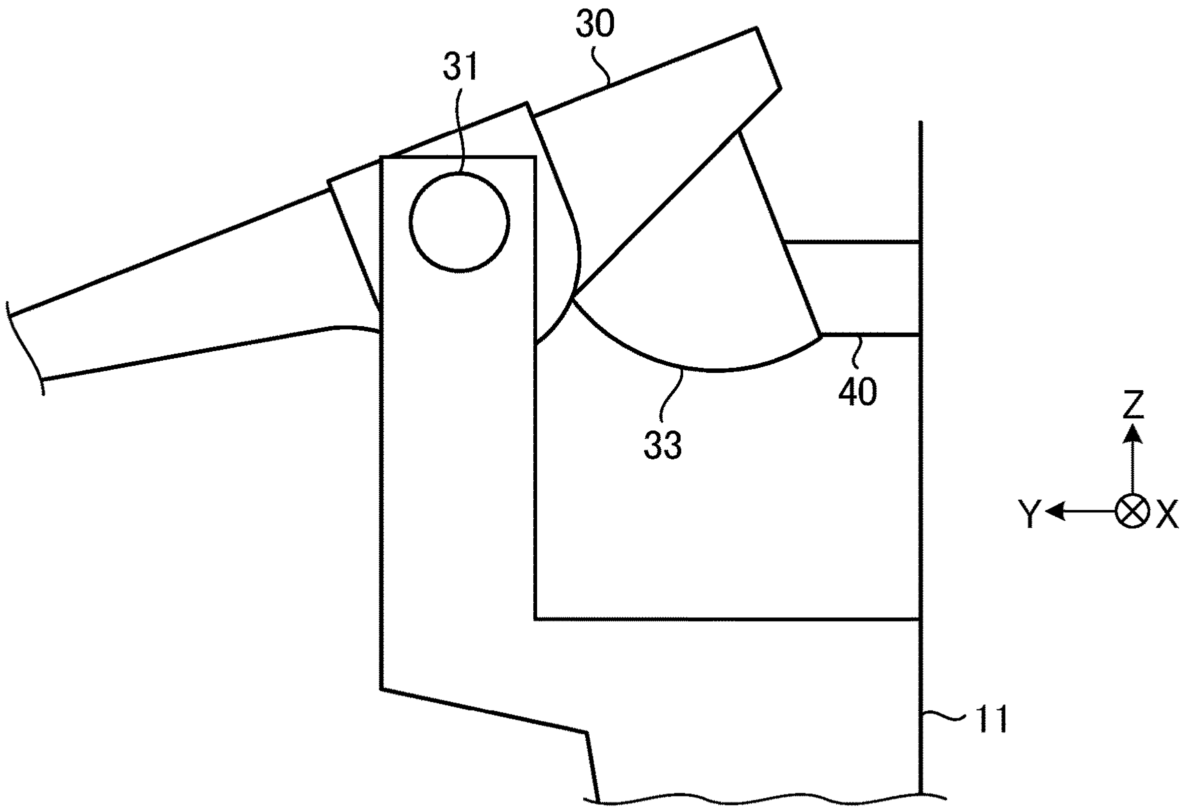
FIG. 5B depicts a positional relation between the second flapper and the photosensor when the remaining amount of the rolled sheet is small in the thermal printer.

How to detect the remaining amount of the rolled sheet 51 will be described with reference to FIGS. 5A and 5B. FIG. 5A depicts an exemplary positional relation between the second flapper 30 and the photosensor 40 when the remaining amount of the rolled sheet 51 stored in the storage unit 18 is sufficiently large. FIG. 5B depicts an exemplary positional relation between the second flapper 30 and the photosensor 40 when the remaining amount of the rolled sheet 51 is small.

As shown in FIG. 5A, the protrusion 33 is formed at the end of the second flapper 30 on the side of the second rotation shaft 31. The protrusion 33 is a plate-shaped member along YZ plane, and its position is changed as the second flapper 30 rotates around the second rotation shaft 31.

As shown in FIG. 5A, the photosensor 40 is installed to detect the position of the protrusion 33. As shown in FIG. 5B, the photosensor 40 can detect the presence of the protrusion 33 in a certain space when the remaining amount of the rolled sheet 51 is reduced and the second flapper 30 is rotated by a certain degree. More specifically, the photosensor 40 is installed toward such a space in which the protrusion 33 is movable according to the posture of the second flapper 30.

As described above, it is possible to easily and reliably detect that the remaining amount of the rolled sheet 51 has decreased based on the position of the protrusion 33 installed at the end of the second flapper 30 using the photosensor 40.

Figure 6A:
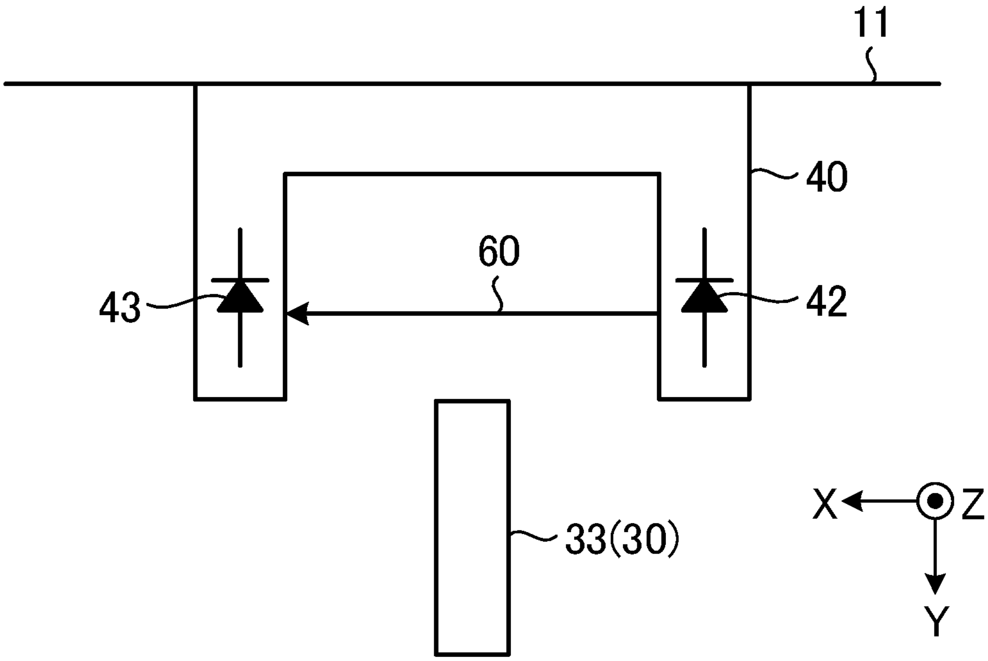
FIG. 6A is a first diagram illustrating how the photosensor detects the remaining amount of the rolled sheet.
Figure 6B:
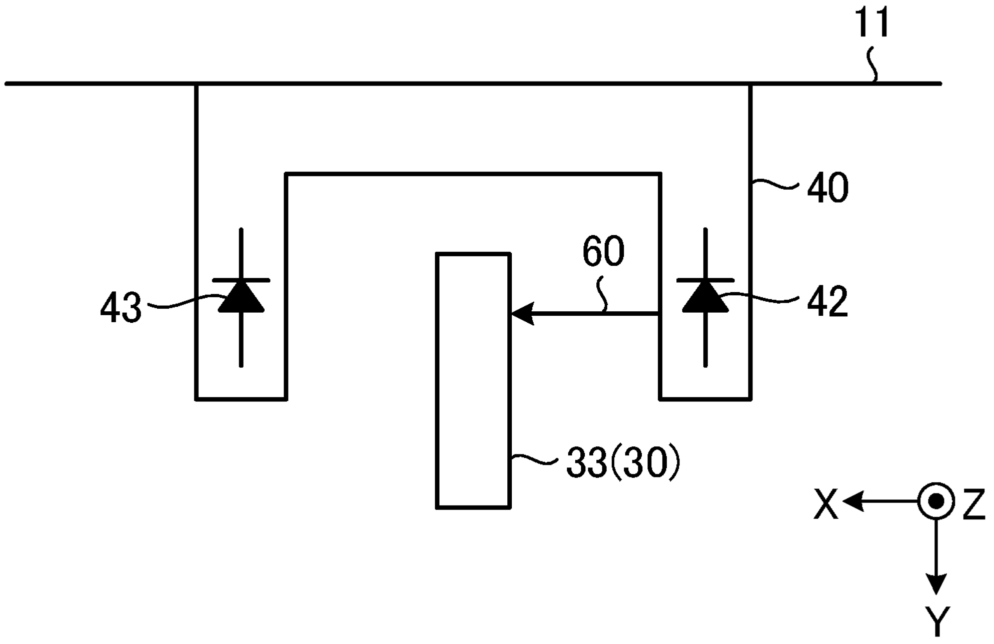
FIG. 6B is a second diagram illustrating how the photosensor detects the remaining amount of the rolled sheet.

Next, methods of detecting the remaining amount of the rolled sheet 51 by the photosensor 40 will be described with reference to FIGS. 6A and 6B. FIG. 6A is a first diagram illustrating how the photosensor 40 detects the remaining amount of the rolled sheet 51. FIG. 6B is a second diagram illustrating how the photosensor 40 detects the remaining amount of the rolled sheet 51.

FIG. 6A shows the positional relation between the second flapper 30 and the photosensor 40 when the remaining amount of the rolled sheet 51 has not reached a predetermined amount (that is, the remaining amount of the rolled sheet 51 is sufficiently large). FIG. 6B shows the positional relation between the second flapper 30 and the photosensor 40 when the remaining amount of the rolled sheet 51 has reached the predetermined amount (that is, the remaining amount of the rolled sheet 51 is small).

In the present embodiment, one end side of a substantially U-shape of the photosensor 40 includes a light emitter 42, and the other end side includes a light receiver 43. The light emitter 42 includes, for example, a light emitting diode (LED). The light emitter 42 irradiates light 60 toward the light receiver 43. The light receiver 43 is constituted by, for example, a photodiode. Upon receiving the light 60 from the light emitter 42, the light receiver 43 outputs a signal corresponding to the amount of the received light. In FIGS. 6A and 6B, the positions of the light emitter 42 and the light receiver 43 may be switched.

As shown in FIG. 6A, when the remaining amount of the rolled sheet 51 has not reached the predetermined amount, the light 60 is not blocked in the space between the light emitter 42 and the light receiver 43 of the photosensor 40, and thus the light receiver 43 receives the light 60 emitted from the light emitter 42. In this case, the light receiver 43 receives the light 60 emitted from the light emitter 42, and outputs a signal corresponding to the amount of the received light 60.

On the other hand, as shown in FIG. 6B, when the remaining amount of the rolled sheet 51 has reached the predetermined amount, the protrusion 33 included in the second flapper 30 is present in the space between the light emitter 42 and the light receiver 43 of the photosensor 40. Therefore, the light receiver 43 does not receive the light 60 emitted from the light emitter 42. In this case, the light receiver 43 does not output any signal.

In this way, the photosensor 40 can detect the state in which the remaining amount of the rolled sheet 51 has reached the predetermined amount, that is, the state in which the remaining amount of the rolled sheet 51 is small, by detecting the protrusion 33.

When the photosensor 40 detects that the remaining amount of the rolled sheet 51 is small, the thermal printer notifies that the remaining amount of the rolled sheet 51 has reached the predetermined amount by turning on or blinking an indicator (not shown) such as a lamp on the lower housing 11 or the upper cover 12. Alternatively, the thermal printer 10 notifies a host computer (not shown) connected thereto that the remaining amount of the rolled sheet 51 is small. When the user recognizes the notification, the user can prepare the rolled sheet 51 for replacement in advance.

Here, although an example of the transmissive photosensor 40 in which the light emitter 42 and the light receiver 43 are disposed at positions facing each other has been shown, the remaining amount of the rolled sheet 51 may be detected by using a reflective photosensor in which the light emitter 42 and the light receiver 43 are disposed on the same side. In this case, when the remaining amount of the rolled sheet 51 decreases, the light 60 emitted from the light emitter 42 is reflected by the protrusion 33 and reaches the light receiver 43, so that the level of the signal output from the light receiver 43 increases. On the other hand, when the remaining amount of the rolled sheet 51 is large, since the light 60 emitted from the light emitter 42 is not reflected by the protrusion 33, the reflected light reaching the light receiver 43 is relatively small, and the level of the signal output from the light receiver 43 is small.

(Operation According to Width of Rolled Sheet 51)

Figure 7A:
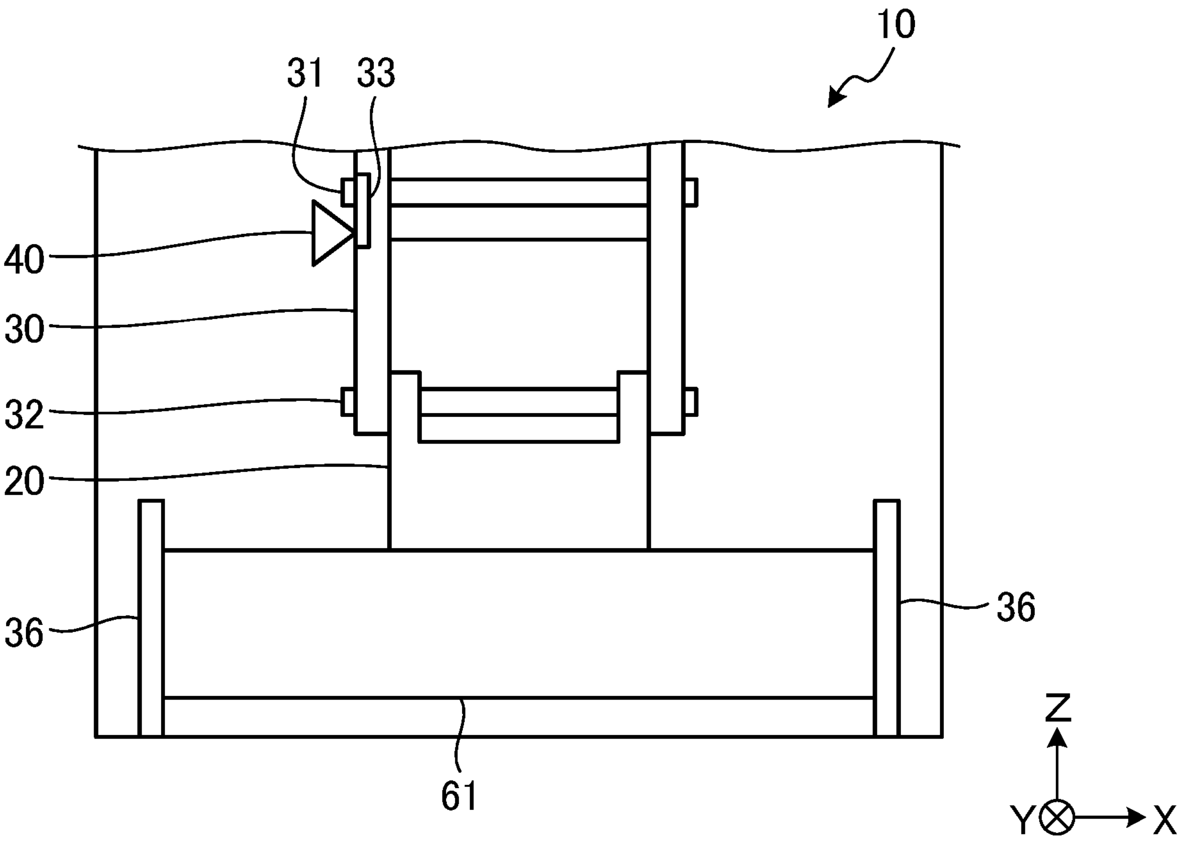
FIG. 7A is a side view showing the thermal printer in which a wide rolled sheet is used.
Figure 7B:
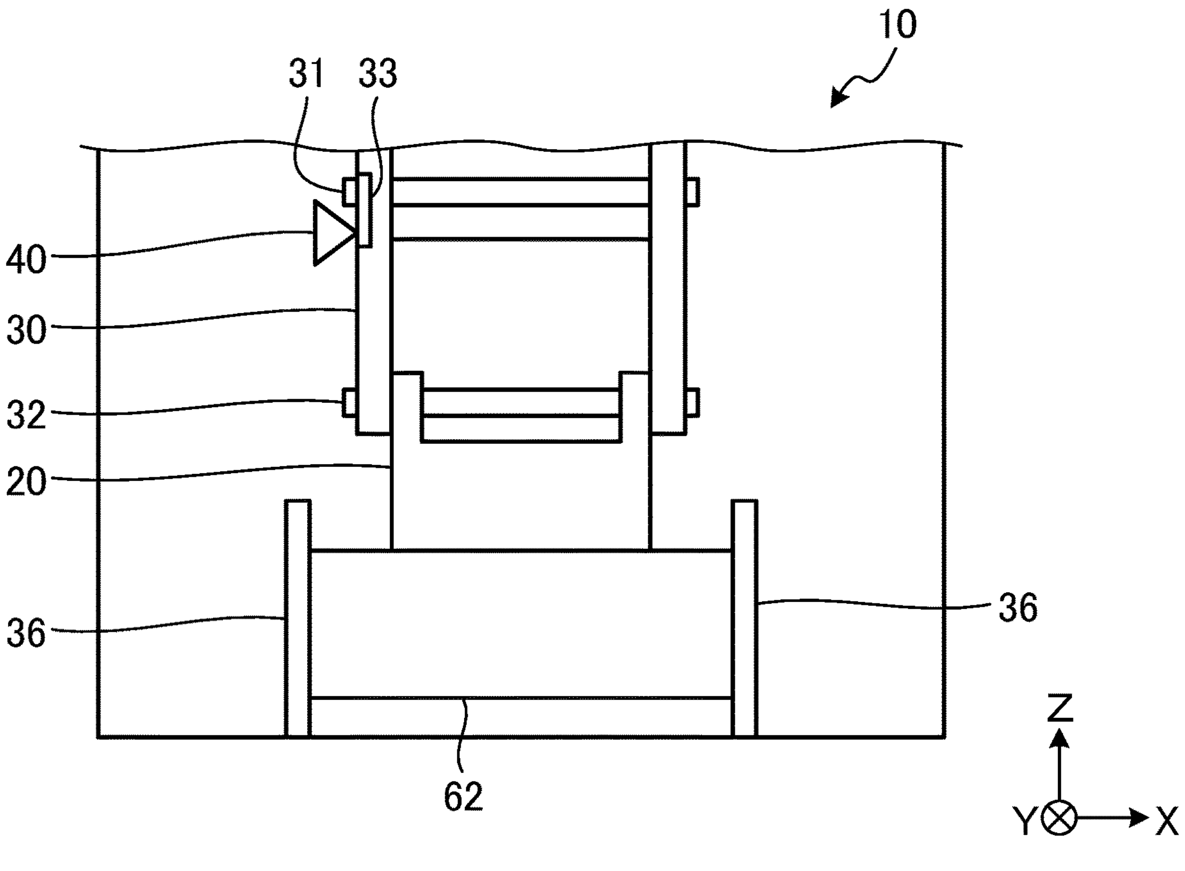
FIG. 7B is a side view showing the thermal printer in which a narrow rolled sheet is used.

The operation of the thermal printer 10 with respect to a wide rolled sheet 61 and a narrow rolled sheet 62 will be described with reference to FIGS. 7A and 7B. FIG. 7A is a side view illustrating the thermal printer 10 that stores the wide rolled sheet 61. FIG. 7B is a side view illustrating the thermal printer 10 that stores the narrow rolled sheet 62.

When the thermal printer 10 is used to print on rolled sheets of varying widths, the operator changes the positions of two support plates 36 shown in FIGS. 7A and 7B. The support plates 36 suppress the movement of the rolled sheet in the width direction.

That is, when the wide rolled sheet 61 is used, as shown in FIG. 7A, the rolled sheet 61 is prevented from moving in the width direction by the support plates 36. Further, the radial movement of the rolled sheet 61 is suppressed by the first flapper 20 and the second flapper 30.

In addition, when the narrow rolled sheet 62 is used, as shown in FIG. 7B, the rolled sheet 62 is prevented from moving in the width direction by the support plates 36. Further, the radial movement of the rolled sheet 62 is suppressed by the first flapper 20 and the second flapper 30.

The remaining amount of the rolled sheet 61 or 62 is stably and accurately detected by the photosensor 40 regardless of the change in the width of the rolled sheet.

(Opening/Closing Mechanism of Upper Cover 12)

Figure 8A:
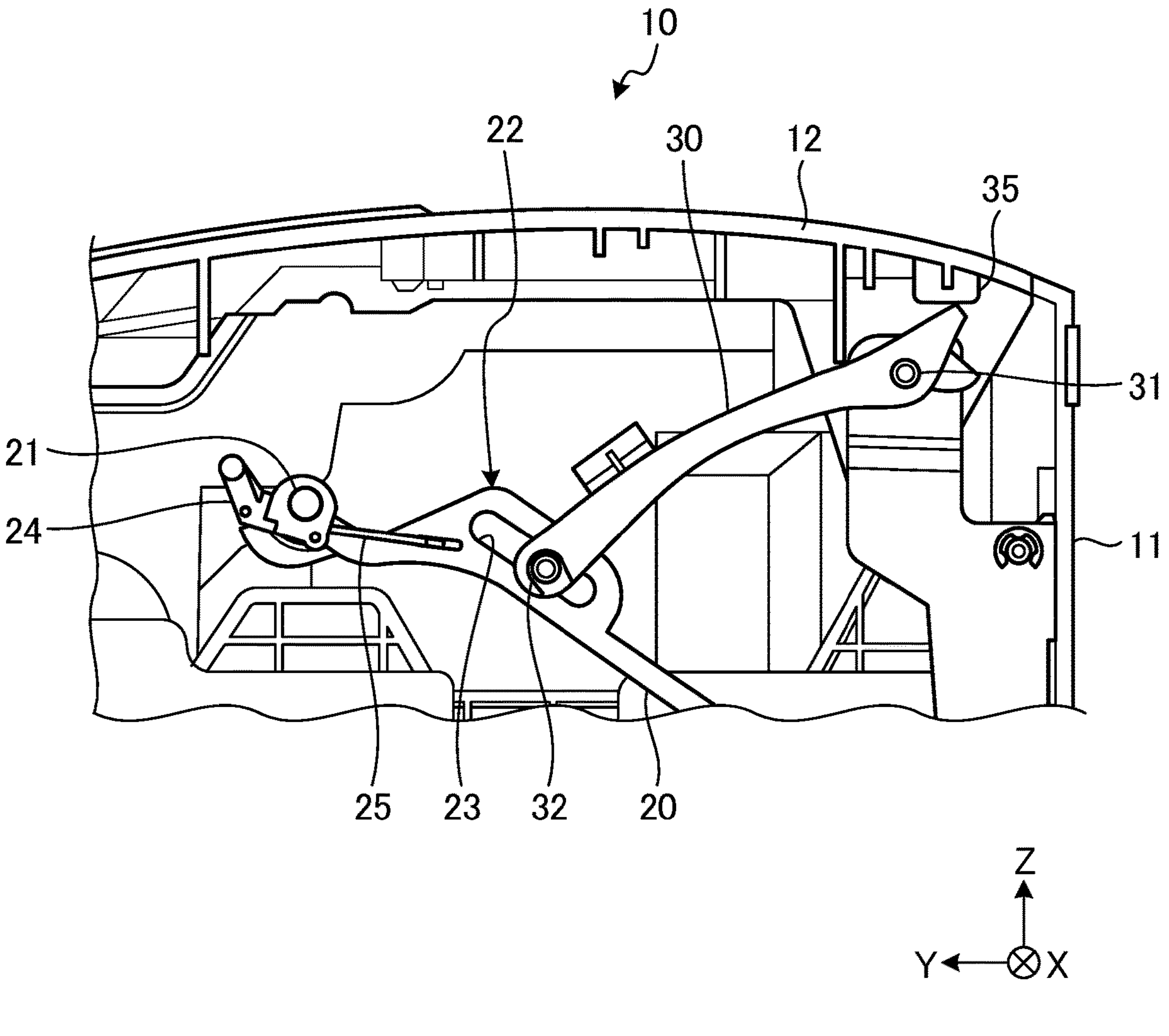
FIG. 8A is a first view illustrating an opening/closing mechanism of the upper cover.
Figure 8B:
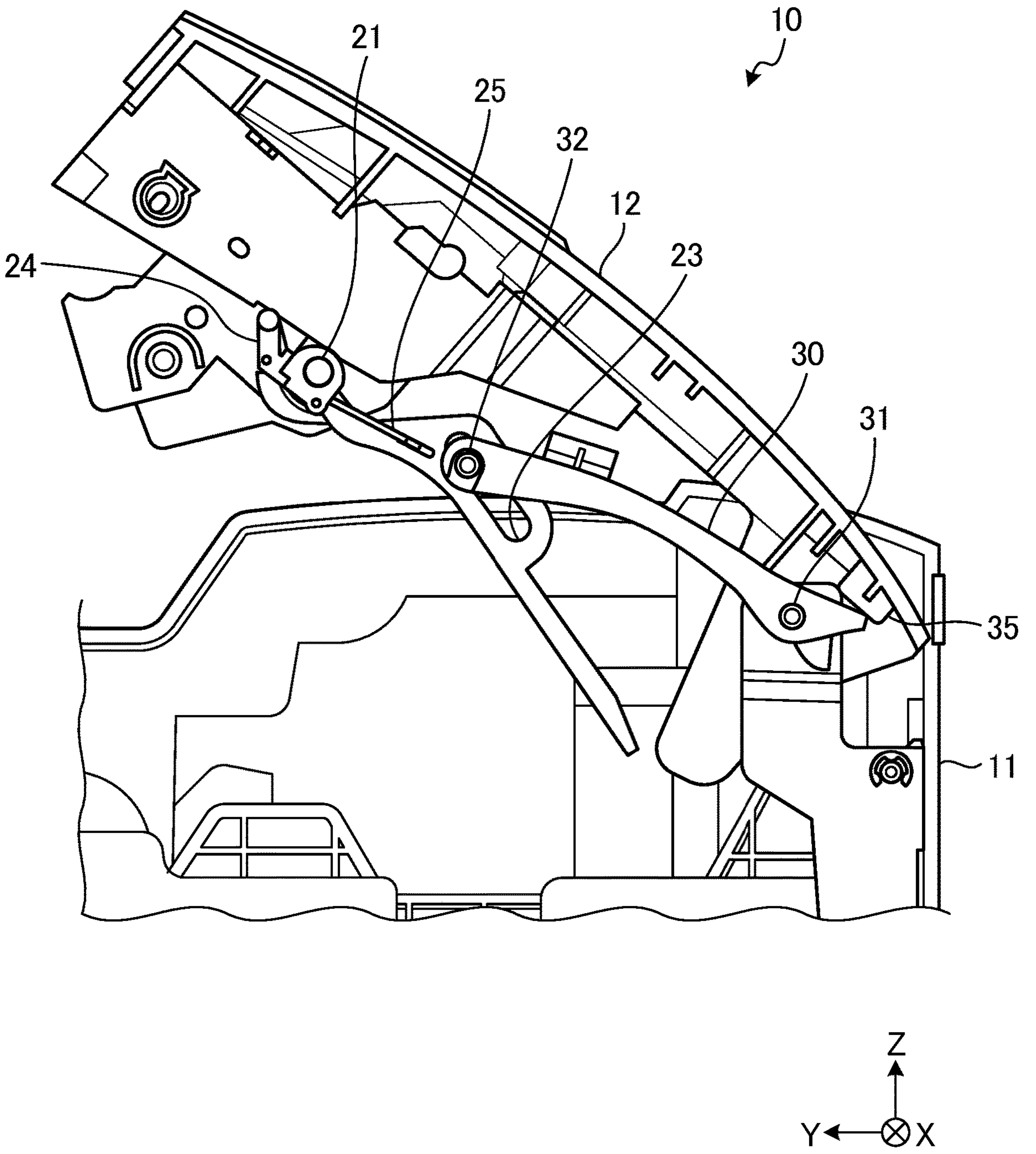
FIG. 8B is a second view illustrating the opening/closing mechanism of the upper cover.
Figure 8C:
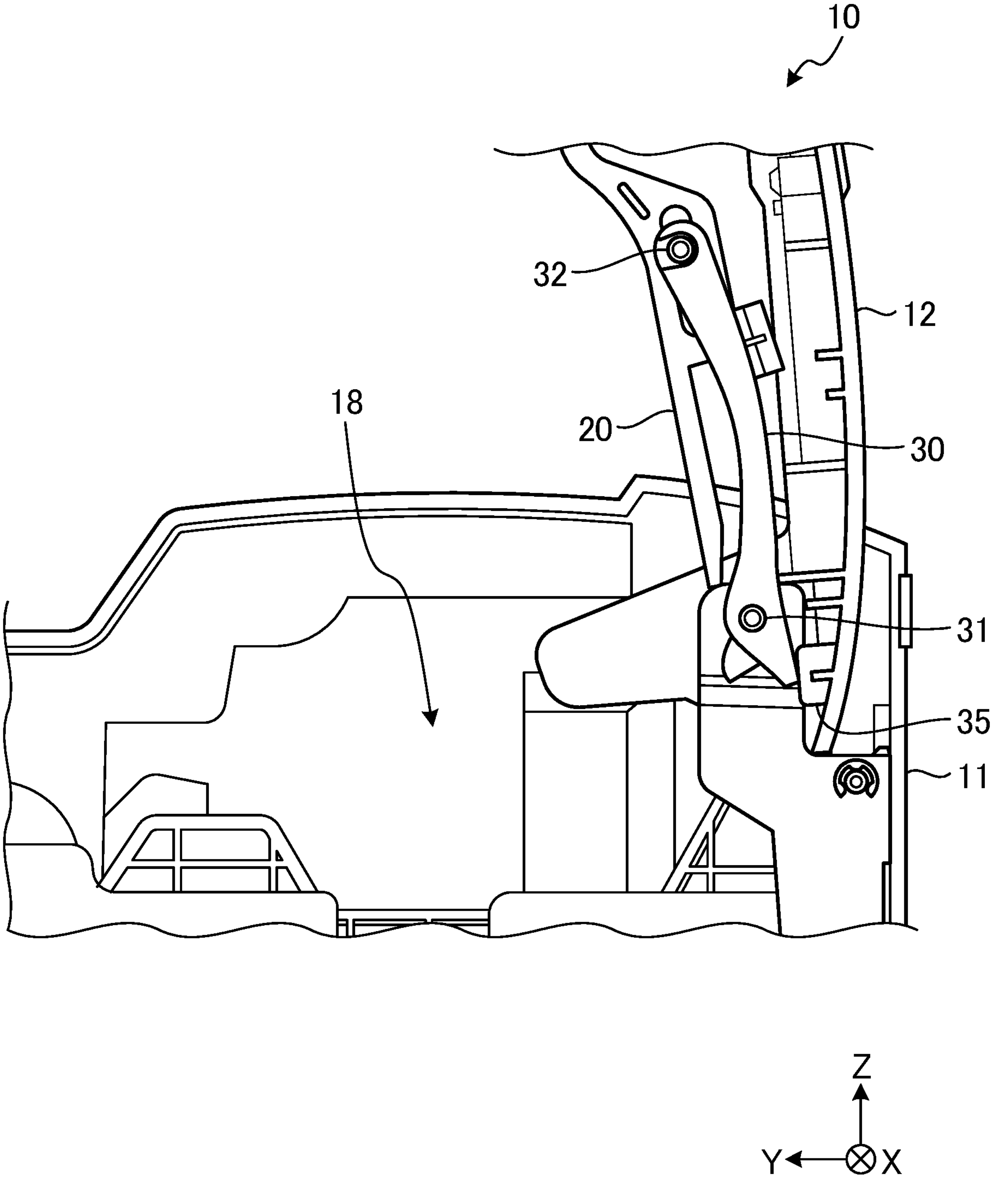
FIG. 8C is a third view illustrating the opening/closing mechanism of the upper cover.

The opening/closing mechanism of the upper cover 12 will be described with reference to FIGS. 8A, 8B, and 8C. FIG. 8A is a first view illustrating the opening/closing mechanism of the upper cover 12. FIG. 8B is a second view illustrating the opening/closing mechanism of the upper cover 12. FIG. 8C is a third view illustrating the opening/closing mechanism of the upper cover 12.

FIG. 8A shows the upper cover 12 that is closed. The torsion spring 25 is installed around the first rotation shaft 21 at the end of the first flapper 20. The torsion spring 25 is prevented from moving about the first rotation shaft 21 by a spring holder 24 and biases the first flapper in the negative Z-axis direction, i.e., clockwise in FIG. 8A. The spring holder 24 is fixed in a state of being sandwiched between the upper cover 12 and the lower housing 11.

The end portion of the second flapper 30 on the second rotation shaft 31 side is in contact with a rib 35 formed on the rear surface side of the upper cover 12. The upper cover 12 opens and closes around an axis (not shown) along the X-axis, which is different from the second rotation shaft 31. Note that the rib 35 is also referred to as the convex portion in the present disclosure.

FIG. 8B shows the upper cover 12 that is opened by approximately 40 degrees. When the upper cover 12 is opened, the second flapper 30 moves along with the upper cover 12 by pushing the end portion of the second flapper 30 on the second rotation shaft 31 side by the rib 35.

Further, the upper cover 12 is opened to release the fixing of the spring holder 24. Accordingly, the biasing of the first flapper 20 is released, and the first flapper 20 is attracted to the upper cover 12 along with the second flapper 30.

FIG. 8C shows the upper cover 12 that opens by about 90 degrees. The first flapper 20 and the second flapper 30 are lifted following the upper cover 12. As a result, the storage unit 18 provided in the lower housing 11 is exposed, so that the rolled sheet 51 can be easily replaced.

On the other hand, when the open upper cover 12 is closed after the rolled sheet 51 is replaced, an operation opposite to that described above is performed. That is, the upper cover 12 is closed in the order of FIGS. 8C, 8B, and 8A. When the upper cover 12 is completely closed, the spring holder 24 is fixed in a state of being sandwiched between the upper cover 12 and the lower housing 11. Accordingly, the torsion spring 25 biases the first flapper in a direction towards the rolled sheet 51.

As described above, the thermal printer 10 includes the rotatable upper cover 12 (or the main body cover) and the lower housing 11, and the rolled sheet 51 can be set and replaced when the upper cover 12 is opened. The thermal printer 10 includes the first flapper 20, one end of which is pivoted in a direction away from the upper cover 12 around the first rotating shaft 21, and the other end of which abuts the outer circumferential surface of the rolled sheet 51. The thermal printer 10 further includes the second flapper 30, one end of which is pivoted around the second rotating shaft 31 parallel to the first rotating shaft 21 installed in the lower housing 11, and the other end of which is slidable at the center of the first flapper according to the angle of the first flapper 20. The thermal printer 10 further includes the photosensor 40, which is sometimes referred to as the remaining amount detection device and detects the remaining amount of the rolled sheet 51 based on the angle of the second flapper 30. Therefore, since the photosensor 40 can be installed at a position independent of the width of the rolled sheet 51, the remaining amount of the rolled sheet 51 can be accurately detected regardless of the width thereof.

Further, in the thermal printer 10, the photosensor is installed in the lower housing 11. Since the photosensor 40 can be installed at a predetermined position independent of the width of the rolled sheet 51, its remaining amount can be accurately detected regardless of the width thereof.

Further, in the thermal printer 10, the photosensor is a reflective or transmissive photosensor that is installed toward a space in which a part of the second flapper 30 (e.g., the protrusion 33) is movable according to its movement. Therefore, the remaining amount of the rolled sheet 51 can be accurately detected with a simple configuration.

Further, in the thermal printer 10, when the upper cover 12 is opened, one end of the second flapper 30 on the side of the upper cover 12 (or the main body cover) is pushed by the convex portion (i.e., the rib 35) provided on the inner side of the upper cover 12, and the first flapper moves along with the inner side of the upper cover 12. When the upper cover 12 is opened, the biasing by the first flapper 20 is released, and the first flapper 20 is pulled toward the upper cover 12 along with the second flapper 30. Thus, when the upper cover 12 is opened, the first flapper and the second flapper 30 are stored in the upper cover 12. Therefore, the rolled sheet 51 can be quickly replaced.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A printer comprising:
- a housing in which a rolled sheet is stored and having an opening through which the rolled sheet can be replaced;
- a head in the housing and configured to print on the rolled sheet;
- a cover by which the opening can be covered;
- a first flapper attached to the cover via a first shaft at a first end of the first flapper, configured to pivot around the first shaft, and biased to press the rolled sheet with a second end of the first flapper, the first end of the first flapper being closer to a front side of the cover than the second end of the first flapper;
- a second flapper attached to the housing via a second shaft at a first end of the second flapper and configured to pivot around the second shaft, a second end of the second flapper being closer to the front side of the cover than the first end of the second flapper and slidably connected to a center portion of the first flapper; and
- a sensor configured to detect that a remaining amount of the rolled sheet has decreased to a predetermined amount, based on an angle by which the second flapper has pivoted.

2. The printer according to claim 1, wherein the sensor is disposed on a rear surface of the housing.

3. The printer according to claim 1, wherein
- the second flapper includes a protrusion at the first end thereof,
- the sensor includes a photosensor configured to detect an object within a detection range, and
- the sensor detects that the remaining amount of the rolled sheet has decreased to the predetermined amount, when the photosensor detects the protrusion within the detection range.

4. The printer according to claim 3, wherein
- the sensor is formed in a U-shape and includes a light emitter configured to emit light and a light receiver facing the light emitter and configured to detect the light emitted from the light emitter, and the sensor detects that the remaining amount of the rolled sheet has decreased to the predetermined amount, when the light receiver does not receive the light from the light emitter.

5. The printer according to claim 3, wherein the sensor is formed in a U-shape and includes a light emitter configured to emit light and a light receiver adjacent to the light emitter and configured to detect the light reflected by an object, and the sensor detects that the remaining amount of the rolled sheet has decreased to the predetermined amount, when the light receiver receives the reflected light having a level that is greater than a threshold.

6. The printer according to claim 1, wherein the cover includes a rib that contacts the first end of the second flapper when the cover is open to prevent the second flapper from pivoting.

7. The printer according to claim 1, further comprising:

a torsion spring on the first shaft and by which a bias force for the first flapper is generated.

8. The printer according to claim 7, wherein the bias force is not generated when the cover is open.

9. The printer according to claim 1, further comprising:

a pair of movable support plates between which the rolled sheet can be sandwiched such that a center of the rolled sheet is aligned with a center of each of the first and second flappers in an axial direction of the rolled sheet.

10. The printer according to claim 9, wherein the center of the rolled sheet is aligned with a center of the sensor in the axial direction of the rolled sheet.

11. A printer comprising:

a housing in which a rolled sheet is stored and having an opening through which the rolled sheet can be replaced;

a printing unit in the housing and configured to print on the rolled sheet;

a cover by which the opening can be covered;

a first rotatable member attached to the housing via a first shaft at a first end of the first rotatable member, configured to pivot around the first shaft, and biased to press the rolled sheet with a second end of the first rotatable member, the first end of the first rotatable member being closer to a front side of the cover than the second end of the first rotatable member;

a second rotatable member attached to the housing via a second shaft at a first end of the second rotatable member and configured to pivot around the second shaft, a second end of the second rotatable member being closer to the front side of the cover than the first end of the second rotatable member and slidably connected to a center portion of the first rotatable member; and a detection device configured to detect that a remaining amount of the rolled sheet has decreased to a predetermined amount, based on an angle by which the second rotatable member has pivoted.

12. The printer according to claim 11, wherein the detection device is disposed on a rear surface of the housing.

13. The printer according to claim 11, wherein the second rotatable member includes a protrusion at the first end thereof, the detection device includes a photosensor configured to detect an object within a detection range, and the detection device detects that the remaining amount of the rolled sheet has decreased to the predetermined amount, when the photosensor detects the protrusion within the detection range.

14. The printer according to claim 13, wherein the detection device is formed in a U-shape and includes a light emitter configured to emit light and a light receiver facing the light emitter and configured to detect the light emitted from the light emitter, and the detection device detects that the remaining amount of the rolled sheet has decreased to the predetermined amount, when the light receiver does not receive the light from the light emitter.

15. The printer according to claim 13, wherein the detection device is formed in a U-shape and includes a light emitter configured to emit light and a light receiver adjacent to the light emitter and configured to detect the light reflected by an object, and the detection device detects that the remaining amount of the rolled sheet has decreased to the predetermined amount, when the light receiver receives the reflected light having a level that is greater than a threshold.

16. The printer according to claim 11, wherein the cover includes a rib that contacts the first end of the second rotatable member when the cover is open to prevent the second rotatable member from pivoting.

17. The printer according to claim 11, further comprising:

a torsion spring on the first shaft and by which a bias force for the first rotatable member is generated.

18. The printer according to claim 17, wherein the bias force is not generated when the cover is open.

19. The printer according to claim 11, further comprising:

a pair of movable support plates between which the rolled sheet can be sandwiched such that a center of the rolled sheet is aligned with a center of each of the first and second rotatable members in an axial direction of the rolled sheet.

20. The printer according to claim 19, wherein the center of the rolled sheet is aligned with a center of the detection device in the axial direction of the rolled sheet.

* * * * *